(12) United States Patent
Galfre' et al.

(10) Patent No.: US 9,028,151 B2
(45) Date of Patent: May 12, 2015

(54) LIGHTWEIGHT HUB BEARING ASSEMBLY AND METHODS OF ASSEMBLING IT

(71) Applicants: Stefano Galfre', Perosa Argentina (IT); Antonio Ruiu, Collegno (IT); Laura Sguotti, Bosco Marengo (IT)

(72) Inventors: Stefano Galfre', Perosa Argentina (IT); Antonio Ruiu, Collegno (IT); Laura Sguotti, Bosco Marengo (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/154,110

(22) Filed: Jan. 13, 2014

(65) Prior Publication Data

US 2014/0199012 A1    Jul. 17, 2014

(30) Foreign Application Priority Data

Jan. 11, 2013    (IT) .............................. TO2013A0025

(51) Int. Cl.
| | | |
|---|---|---|
| *F16C 19/00* | (2006.01) | |
| *F16C 43/04* | (2006.01) | |
| *B21K 1/40* | (2006.01) | |
| *B60B 27/00* | (2006.01) | |
| *F16C 35/063* | (2006.01) | |
| *F16C 19/18* | (2006.01) | |
| *F16C 33/60* | (2006.01) | |

(52) U.S. Cl.
CPC ......... *B60B 27/0005* (2013.01); *F16C 2226/52* (2013.01); *F16C 35/063* (2013.01); *F16C 19/185* (2013.01); *F16C 33/60* (2013.01); *F16C 2326/02* (2013.01); *F16C 2226/34* (2013.01)

(58) Field of Classification Search
CPC .... F16C 35/042; F16C 35/063; F16C 35/067; F16C 43/04; F16C 2326/02
USPC .......................... 384/537, 544, 584, 585, 589
See application file for complete search history.

(56) References Cited

U.S. PATENT DOCUMENTS

| | | | |
|---|---|---|---|
| 2011/0235957 A1* | 9/2011 | Vissers et al. .................. | 384/523 |
| 2011/0255819 A1* | 10/2011 | Vissers et al. .................. | 384/564 |

FOREIGN PATENT DOCUMENTS

| | | |
|---|---|---|
| DE | 10129700 A1 | 8/2002 |
| DE | 102004033669 A1 | 2/2005 |
| DE | 102006008438 A1 | 9/2007 |
| JP | 2002235755 A | 8/2002 |
| JP | 2007225012 A | 9/2007 |
| WO | 2005005062 A1 | 1/2005 |

* cited by examiner

*Primary Examiner* — Phillip A Johnson
(74) *Attorney, Agent, or Firm* — Bryan Peckjian; SKF USA Inc. Patent Dept

(57) ABSTRACT

A hub bearing assembly includes a hub made of lightweight metallic material and forming a cylindrical portion, on which a tubular inner ring providing a raceway is mounted; a second inner ring is fixed on the first tubular inner ring and provides a second raceway; a cylindrical interstice is formed between the cylindrical portion of the hub and the tubular inner ring and contains a bonding brazing material which integrally joins the hub to the first tubular inner ring.

13 Claims, 3 Drawing Sheets

LIGHTWEIGHT HUB BEARING ASSEMBLY AND METHODS OF ASSEMBLING IT

CROSS-REFERENCE TO RELATED APPLICATION

This application is a United States Non-Provisional Utility Patent Application claiming the benefit of Italia Patent Application Number TO2013A000025 filed on 11 Jan. 2013, which is incorporated herein in its entirety. It is noted that 11 Jan. 2013 falls on a Saturday; therefore Applicant is afforded until the next business day to maintain co-pendency.

TECHNICAL FIELD

The present invention relates to a lightweight hub bearing assembly for a motor vehicle wheel. The invention also relates to a method of assembling this assembly.

BACKGROUND ART

In the motor vehicle industry, there is an increasing demand for the reduction of the weight of motor vehicle components, with the aim of reducing fuel consumption and exhaust emissions. In order to reduce the overall weight of the wheel, and in particular of the rotating part of the wheel, hub bearing assemblies having a rotatable flanged ring composed of two different materials, joined together in a single piece, have been proposed in recent years. In these rings, a tubular core made of a first material having a high toughness, such as bearing grade steel, forms the raceways; a second, lightweight material, such as a lightweight metal, forms the remaining part of the ring, including an outer flange for mounting the wheel.

In some cases, the connection between the steel core and the lighter flange is provided by a positive connection. These connections do not always prove to be durable over time, above all after prolonged use. In fact, the different coefficients of thermal expansion of the steel and of the aluminum tend to cause separation of the two materials. In other cases, the connection is made by overmolding or casting the lightweight material, for example an aluminum alloy, on the tubular steel core. To avoid or limit relative movements between the two materials, in the rings of this type the two materials are joined by interface surfaces having a complex shape, in order to realize undercuts which act like joints between the two materials. See, for example, patent publication WO 2008/147284 A1. The production costs for the rings realized by this technique are rather high.

SUMMARY OF THE PRESENT INVENTION

It is an object of the present invention therefore to provide a hub bearing assembly of reduced weight, confronting mainly the problem of forming a reliable mechanical connection between two different materials forming the hub, optimizing the production costs.

To achieve the objects mentioned above, the invention proposes forming a hub bearing assembly having the features defined in claim 1. According to another aspect, the invention proposes a method of assembly as defined in claim 8. Preferred embodiments of the invention are defined in the dependent claims.

BRIEF DESCRIPTION OF DRAWINGS

A number of preferred but non-limiting embodiments of the invention are described herein below; reference is made to the attached drawings, in which.

DETAILED DESCRIPTION OF THE PRESENT INVENTION

Figure 1:
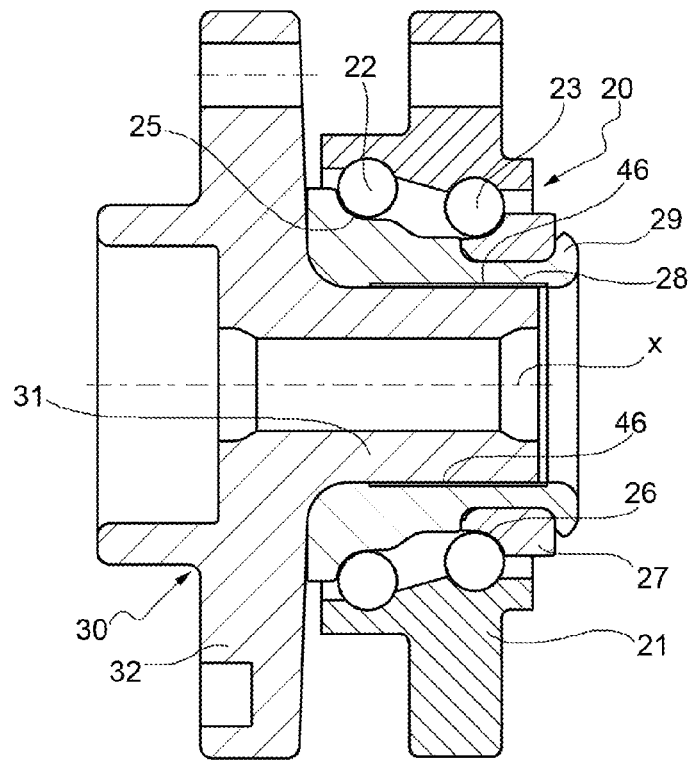
FIG. 1 is an axial cross-sectional schematic view of a hub bearing assembly according to an exemplary embodiment of the present invention.
Figure 2:
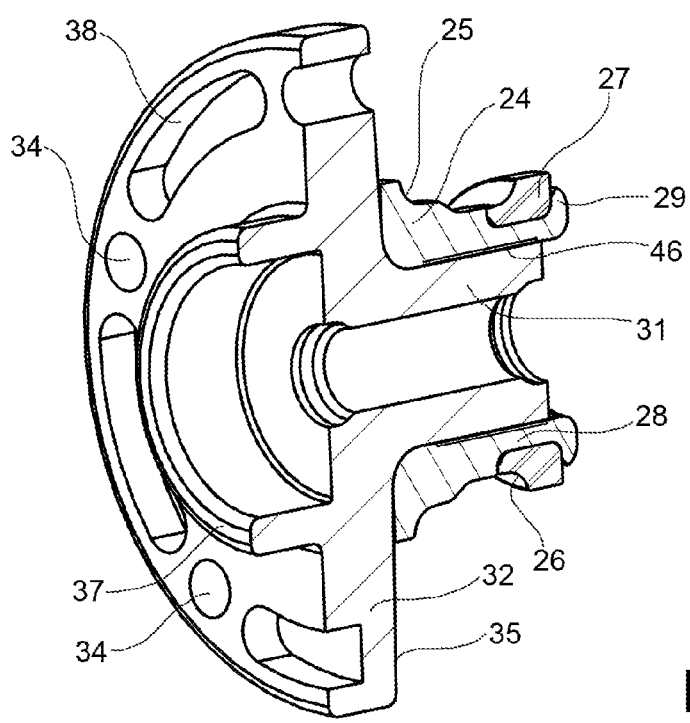
FIG. 2 is a cut-away perspective view of a flanged hub, which makes up part of the assembly shown in FIG. 1, with two bearing rings fixed to the hub.

An example of a hub bearing assembly provided according to the invention is shown in axial cross section in FIG. 1.

The assembly comprises a hub 30 made of a lightweight metallic material, preferably of an aluminum alloy, and a bearing unit 20 having a twin row of rolling elements.

The bearing unit comprises an outer ring 21 providing two outer raceways for accommodating a first row 22 and a second row 23 of rolling elements, in this example balls. The bearing unit further comprises a tubular inner ring 24 providing a first, axially outer raceway 25 for the first row 22 of rolling elements. A second inner raceway 26, for the axially inner row 23 of rolling elements, is formed on an inner ring 27 provided separately to the tubular ring 24. The inner ring 27 is provided separately so as to allow the second row 23 of rolling elements to be inserted into the bearing unit after the outer ring 21 has been mounted on the first row 22. The inner ring 27 is mounted on an axial extension 28 of the tubular inner ring 24. An axially inner end of the axial extension 28 is cold-deformed by orbital rolling in a radially outer direction; this provides a plastically deformed rolled edge 29 which axially locks the inner ring 27.

The hub bearing assembly defines a central axis of rotation x and is intended for the rotatable mounting of a motor vehicle wheel (not shown) about the axis x. Throughout the present description and in the claims, terms and expressions indicating positions and directions, for example "radial", "axial" and "transverse", are understood as referring to the axis of rotation x. Expressions such as "axially inner" (or "inboard") and "axially outer" (or "outboard") refer instead to the mounted state on the vehicle.

Figure 3:
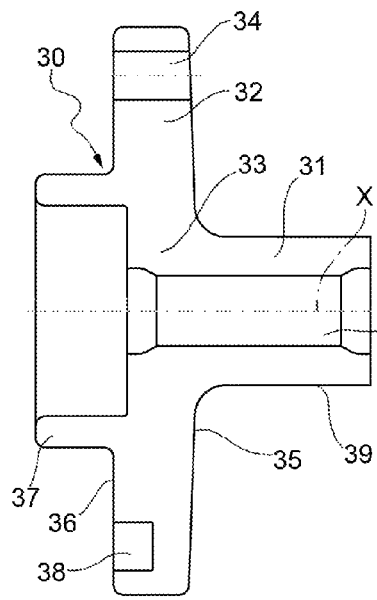
FIG. 3 is an axial cross-sectional view of the flanged hub.

The hub 30 (shown apart in FIG. 3) forms, in a single piece of a lightweight metallic material, a cylindrical portion 31 extending in an axial direction, and a flange 32 extending in a radially outer direction from an axially outer end 33 of the cylindrical portion 31.

The hub 30 can be formed, for example, by melting or by forging. Examples of aluminum alloys which can form the hub include, but are not limited to, the following: 6061 T6, 6082 T6 or T5, A 356 T6, 43500 T6. Once the desired shape has been obtained, the hub can be subjected to a thermal cycle, preferably a T6 thermal cycle, which makes it possible to improve the mechanical properties of the aluminum alloy material. As an alternative, the hub can be subjected to a precipitation hardening heat treatment.

The flange 32 serves for mounting a wheel of the vehicle. Four/five axial holes 34 can be obtained in the flange at angularly equidistant positions about the axis x. The holes 34 can accommodate a corresponding plurality of fixing elements (not shown), for example screws, for fixing the wheel. The flange 32 provides an axially inner radial surface 35, intended to face towards the vehicle in use, and an axially outer radial face 36, forming a flat bearing surface for a brake rotor (not shown) and/or for the wheel. The hub 30 can also form a tubular axial lug 37, which protrudes from the axially outer side and is suitable for facilitating the centring of the wheel. 38 denotes optional lightening cavities formed in the flange 32.

The cylindrical portion 31 provides a radially outer cylindrical surface 39, which is introduced into the tubular inner ring 24, as described herein below.

In the embodiment shown here, the cylindrical portion 31 has a tubular shape and has, in this example, an axially extending cylindrical inner cavity 40. In the particular embodiment shown, the inner cavity 40 is continuous. In other embodiments, depending on the type of wheel to be mounted (for example driving or driven), the cavity 40 can be closed. In embodiments with further differences, the cylindrical portion 31 can be internally solid, i.e. without the cavity 40.

Figure 4:
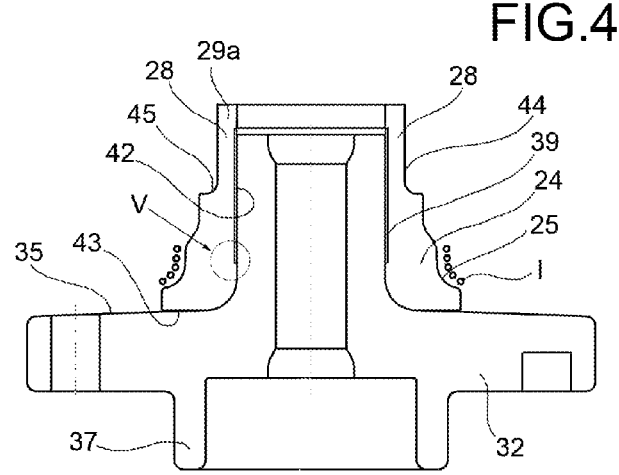
FIGS. 4, 6, 7 and 8 are cross-sectional views showing steps for assembling the hub bearing assembly.
Figure 6:
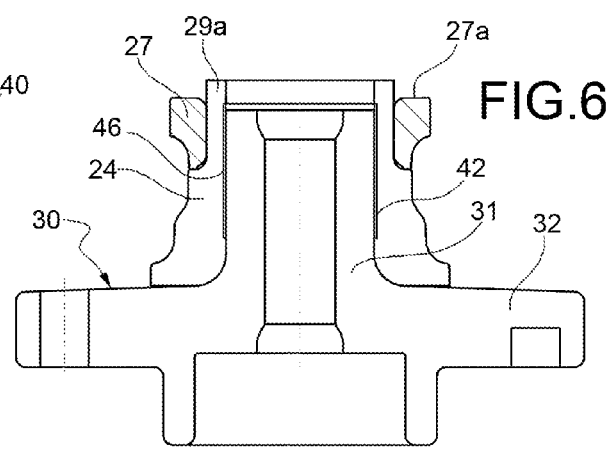

According to a first embodiment of the method, a hub 30 is oriented by arranging the cylindrical portion 31 vertically, with the axially inner end facing upwards (FIG. 4). The tubular inner ring 24 forming the raceway 25 for the row of rolling elements 22 is placed onto the cylindrical portion 31. The tubular inner ring 24 is preferably made of bearing grade steel. The tubular ring 24 provides a radially inner axial cylindrical cavity 42, a radial surface 43 at an axially outer end and the axial extension 28 having an axially inner, initially straight, tubular end 29a. The axial extension 28 has an outer cylindrical surface 44 joined to a radial shoulder 45, which faces in an axially inner direction.

The tubular ring 24 is pushed along the cylindrical portion 31 of the hub until the axially outer radial surface 43 is in abutment against the axially inner side 35 of the flange 32.

Figure 5:
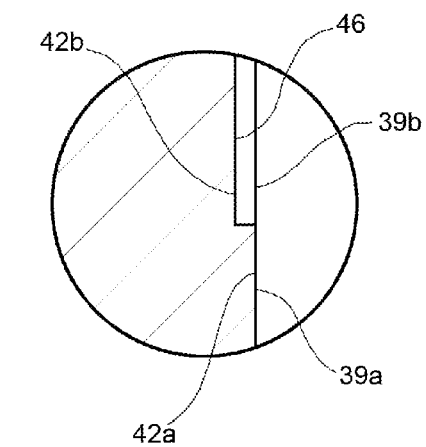
FIG. 5 is an enlarged view of a detail denoted by "V" in FIGS. 4 and 7.
Figure 7:
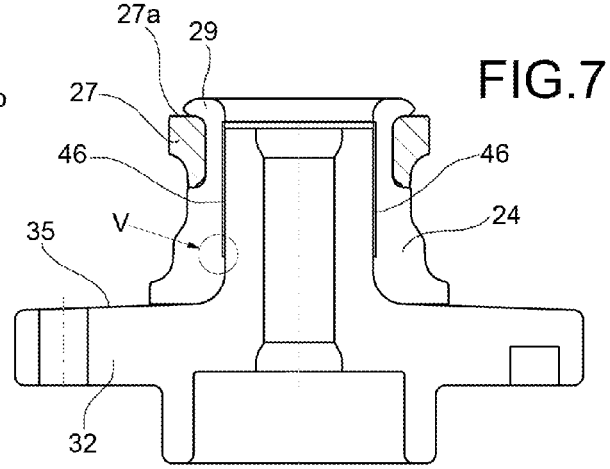

As shown schematically in the enlarged view in FIG. 5, a cylindrical interstice 46 is defined between the outer cylindrical surface 39 of the hub and the axial cylindrical cavity 42 of the tubular ring 24. The radial thickness of the interstice 46 can vary depending on different factors. The embodiment described here, which provides for the introduction of a brazing material into the interstice 46, has afforded experimental results promoting cylindrical interstices having a radial thickness of between about 70 and about 100 microns. This range is purely indicative; the method can also be carried out with greater radial thicknesses.

The cylindrical interstice 46 is preferably closed or sealed at the axially outer end (FIG. 5) owing to the contact between the cylindrical cavity 42 of the tubular ring 24 and the outer cylindrical surface 39 of the hub. In the example shown, the cylindrical cavity 42 is formed with an axially outer portion 42a of a diameter such that it requires coupling with radial interference with the outer cylindrical surface 39 of the hub, and a portion 42b axially further in having a diameter slightly greater than the diameter of the portion 42a. More particularly, the portion 42a, axially closer to the flange 32, is coupled with radial interference with a first length 39a, axially further out, of the outer cylindrical surface 39 of the hub; a portion 42b of the cavity 42, axially farther from the flange 32, has an inner diameter greater than the outer diameter of a second length 39b, axially further in, of the outer cylindrical surface 39. This second length 39b radially faces and is spaced apart from the portion 42b of greater diameter and identifies, with this wider portion 42b, the cylindrical interstice 46.

In a different embodiment, the cylindrical interstice 46 is created by reducing the outer diameter of an axially inner length of the outer cylindrical surface 39 of the tubular portion 31; in an in turn different embodiment, the cylindrical interstice 46 is created in part by reducing the outer diameter of an axially inner length of the outer cylindrical surface 39 of the tubular portion 31 and in part by creating a widened portion 42b in the cavity 42 which radially faces the aforementioned length of reduced outer diameter of the outer cylindrical surface 39.

The interstice 46 is open at its axially inner end, facing upwards in the example shown in FIGS. 4-7. Therefore, a bonding material is introduced into the interstice 46 around the cylindrical portion 31 of the hub. In one embodiment of the method, the bonding material is a brazing material having a melting temperature below both the annealing temperature of the metallic alloy of which the hub is made and the tempering temperature of the steel forming the tubular ring 24. Brazing alloys can be used, for example, as brazing material. The brazing material can be in the form of an annular or ring-like sheet.

The brazing material is then heated and made to melt, for example by applying a coil inductor (not shown) around the tubular ring 24. Depending on the features of the brazing material and on the radial thickness of the interstice 46, the molten brazing material drips by gravity and penetrates by capillarity into the interstice, filling it. The brazing material then cools and solidifies, thereby creating a firm mechanical joint at the interface between the hub and the tubular ring 24.

It is preferable that the steel surface of the cylindrical cavity 42 is not ground, since a certain degree of roughness increases the adherence between the steel and the applied brazing material.

Suitable brazing alloys for the method for joining the steel and the aluminum alloy are, for example:
- "509 Strongset", marketed by the company ESAB; brazing temperature=265° C., tensile strength approximately 200 MPa;
- "Al Solder 500", marketed by the Harris Product Group; brazing temperature=199° C., tensile strength approximately 135 MPa;
- "Nocolok", marketed by Solvay Chemicals; brazing temperature=613° C., tensile strength approximately 240 MPa.

Experimental tests carried out by the applicant showed optimum results in terms of mechanical resistance, with the complete absence of any thermal stability problems over the life of the hub bearing assembly.

The second inner bearing ring 27, which provides the radially inner raceway 26 for the axially inner row 23 of rolling elements, is then placed onto the axial extension 28 of the tubular ring 24, to be precise on the outer cylindrical surface 44. The inner ring 27, which can be a conventional inner bearing ring, is placed axially abutting against the shoulder 45 of the tubular ring 24. In order to further improve the reciprocal circumferential locking between the rings 24 and 27, the inner ring 27 can be mounted with radial interference on the cylindrical surface 44 of the tubular ring 24. In this state (FIG. 6), the end 29a of the tubular ring 24 protrudes axially, at least in part, beyond a radial surface or terminal face 27a of the inner ring 27 facing in an axially inner direction.

The tubular end 29a (FIG. 7) is then cold-deformed by orbital rolling in a radially outer direction. This provides the plastically deformed rolled edge 29, which axially locks the inner ring 27 against the shoulder 45 of the tubular ring 24 and axially preloads the entire bearing unit 20.

Experts in the field know that the orbital rolling step is carried out after a number of steps for assembling the bearing unit in which the hub 30 is integrated; these steps which precede the orbital rolling step provide for firstly arranging the row of rolling elements 22 from the axially outer side or outboard side around the tubular ring 24, then for applying the radially outer bearing ring 21, and then for inserting the row of rolling elements 23 from the axially inner side or inboard side, after which it is possible to apply the inner ring 27 and finally carry out the orbital rolling.

The brazing step can optionally be carried out simultaneously with an induction hardening step, which can be carried out so as to harden the area of the raceway 25 of the tubular ring 24. The same inductor, which is denoted schematically by I in FIG. 4, is thus advantageously used both for hardening the raceway 25 and to cause the brazing material to melt.

Figure 8:
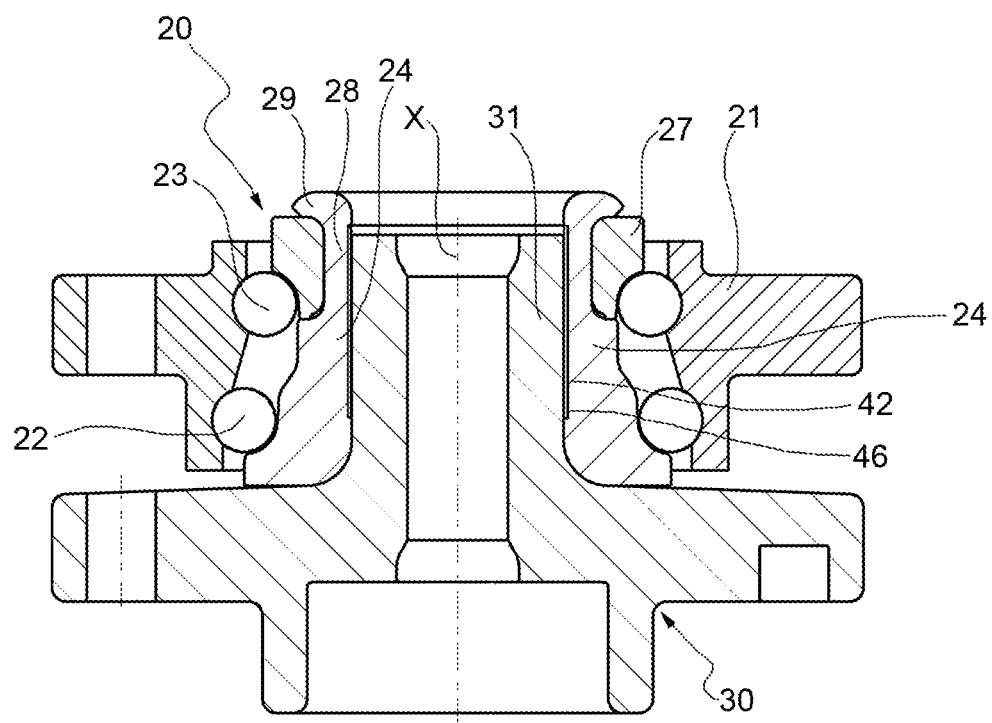

According to another embodiment of the method, shown in FIG. 8, the brazing step for joining the hub to the tubular ring 24 can be carried out after the entire bearing unit 20 has been preassembled, complete with a tubular ring 24, outer ring 21, the twin row of rolling elements 22, 23 and the inner ring 27 locked by the rolled edge 29 of the tubular ring 24. In accordance with this embodiment, the entire preassembled bearing unit 20 is applied to the cylindrical portion 31 of the hub. In a manner entirely analogous to that described above, this is followed by applying the brazing material into the interstice 46 identified between the cylindrical surfaces 39 and 42, causing the brazing material to melt and solidifying the molten material which fills the interstice.

It is to be understood that the invention is not limited to the embodiments described and shown herein, which are to be considered as examples of the assembly and of the methods of assembling it; it is clear to the experts in the field that numerous modifications can be made in terms of forms, dimensions, design and functional details and the configuration of the elements described in the exemplary embodiment, without thereby departing from the scope of the invention as defined in the accompanying claims and their equivalents.

What is claimed is:

1. A hub bearing assembly, comprising:
   a hub forming, in a single piece of a first metallic material:
      a cylindrical portion extending in an axial direction and having a cylindrical outer surface, and
      a flange extending in a radially outward direction from an axially outer end of the cylindrical portion;
   a bearing unit, comprising:
      an outer ring providing two outer raceways for accommodating a first, axially outer row and a second, axially inner row of rolling elements,
      a first tubular inner ring made of a second metallic material and providing a first raceway for the first row of rolling elements and an inner, axially extending cylindrical cavity, and
      a second inner ring providing a second raceway for the second row of rolling elements, the second inner ring being fixed on the first tubular inner ring;
   a cylindrical interstice, formed between the outer cylindrical surface of the hub and the axial cylindrical cavity of the first tubular inner ring, and
   a brazing material contained in the interstice and integrally joined to the outer cylindrical surface of the hub and the axial cylindrical cavity of the first tubular inner ring.

2. A hub bearing assembly according to claim 1, wherein the first tubular inner ring further provides:
   a radial surface at an axially outer end, axially abutting against the flange of the hub;
   an axial extension extending in an axially inner direction and providing an outer cylindrical surface;
   a radial shoulder facing an axially inner direction and joined to the outer cylindrical surface;
   a tubular end edge plastically deformed in a radially outer direction against a radial surface of an axially inner end of the second inner ring, so as to axially lock the second inner ring against the radial shoulder and axially preload the entire bearing unit.

3. A hub bearing assembly according to claim 1, wherein the cylindrical interstice is closed or sealed at an axially outer end thereof.

4. A hub bearing assembly according to claim 3, wherein the cylindrical cavity provides:
   a portion axially closer to the flange, coupled with radial interference with a first length of the outer cylindrical surface of the hub, so as to close or seal the cylindrical interstice at an axially outer end thereof, and
   a portion axially farther from the flange, having an inner diameter greater than an outer diameter of a second length of the outer cylindrical surface of the hub, wherein the second length is axially inner with respect to the first length, the second length being radially facing and spaced from the portion of greater diameter and identifying, with this greater diameter portion of the cylindrical cavity, the cylindrical interstice.

5. A hub bearing assembly according to claim 1, wherein the first metallic material is an aluminum alloy, and the second metal material is a bearing grade steel.

6. A method of assembling a hub bearing assembly, comprising the steps of:
   a1) providing a hub forming, in a single piece of a first metallic material:
      a cylindrical portion extending in an axial direction and having a cylindrical outer surface, and
      a flange extending in a radially outward direction from an axially outer end of the cylindrical portion;
   a2) providing a first tubular inner bearing ring made of a second metallic material and providing a first raceway for a first row of rolling elements and an inner, axially extending cylindrical cavity;
   b) arranging said tubular ring around the cylindrical portion of the hub so as to define a cylindrical interstice between the outer cylindrical surface of the hub and the axial cylindrical cavity of the tubular ring;
   c) integrally bonding the hub and the tubular ring by means of a brazing material contained in the interstice.

7. A method according to claim 6, wherein the interstice has an axially inner open end and step c) is preceded by the step of introducing the brazing material in the interstice through said open end.

8. A method according to claim 6, wherein step c) comprises the step of orienting the hub by arranging the cylindrical portion with the axially inner end facing upwards.

9. A method according to claim 6, wherein step c) includes the steps of melting the brazing material, allowing the molten brazing material to fill the interstice at least partially, and then solidifying the brazing material so that the solidified brazing material is integrally joined to the outer cylindrical surface of the hub and the axial cylindrical cavity of the first tubular inner ring.

10. A method according to claim 9, wherein in step c) the step of melting the brazing material occurs simultaneously with an induction hardening step, and these two simultaneous steps are carried out by means of an inductor arranged around the raceway of the first tubular inner ring, so as to harden the raceway and cause the brazing material contained in the interstice to melt.

11. A method according to claim 6, wherein step b) includes the step of sealing an axially inner end of the interstice by coupling with radial interference an axially outer length of the outer cylindrical surface of the hub and an axially outer portion of the cylindrical cavity.

12. A method according to claim 6, wherein step b) is preceded by the step of preassembling the first tubular inner ring in a bearing unit, the bearing unit comprising:
- an outer ring providing two outer raceways for accommodating a first axially outer row and a second axially inner row of rolling elements;
- the first tubular inner ring;
- a second inner ring providing a second raceway for the second row of rolling elements, the second inner ring being mounted around an axial extension, which extends in an axially inner direction, of the first tubular inner ring;
- two rows of rolling elements;
- a tubular end edge formed by the tubular extension and plastically deformed in a radially outer direction against a radial surface of an axially inner end of the second inner ring.

13. A method according to claim 6, wherein step c) is followed by the step of assembling the first tubular inner ring in a bearing unit, comprising:
- an outer ring providing two outer raceways for accommodating a first axially outer row and a second axially inner row of rolling elements;
- the first tubular inner ring;
- a second inner ring providing a second raceway for the second row of rolling elements, the second inner ring being mounted around an axial extension, which extends in an axially inner direction, of the first tubular inner ring;
- two rows of rolling elements;
- a tubular end edge formed by the tubular extension and plastically deformed in a radially outer direction against a radial surface of an axially inner end of the second inner ring.

* * * * *